May 15, 1923.
W. ZIESEL
DENTAL LANCET FOR SURGICAL TREATMENT OF PYORRHEA
Filed Aug. 4, 1921
1,455,374
2 Sheets-Sheet 1
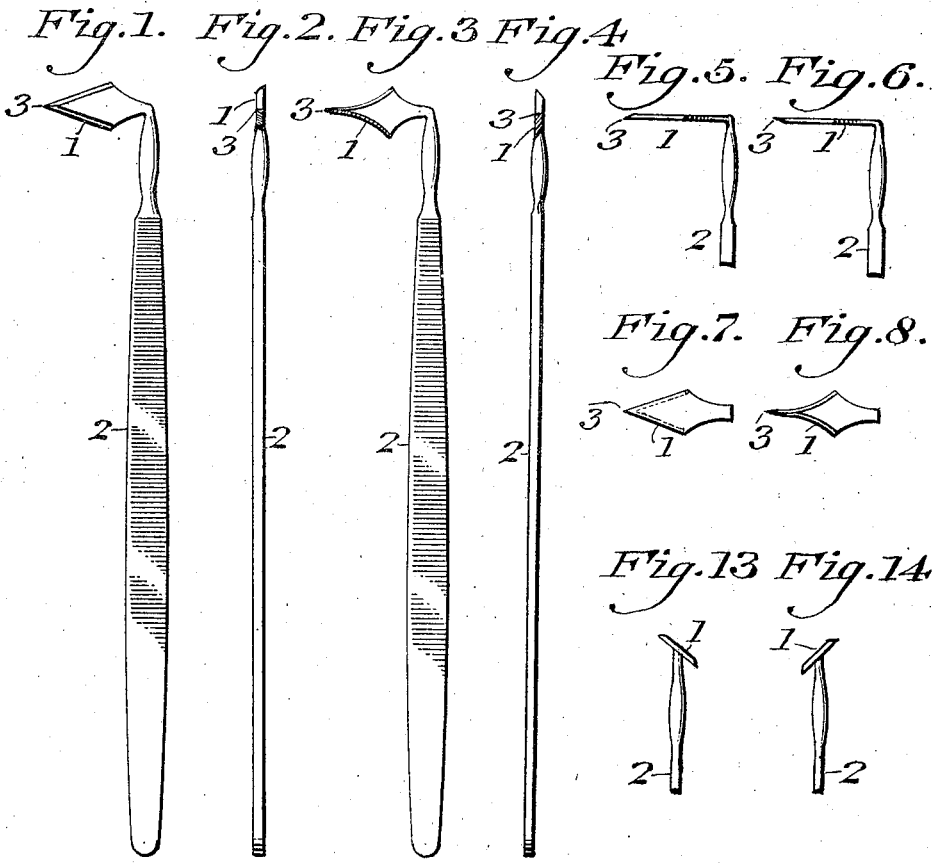

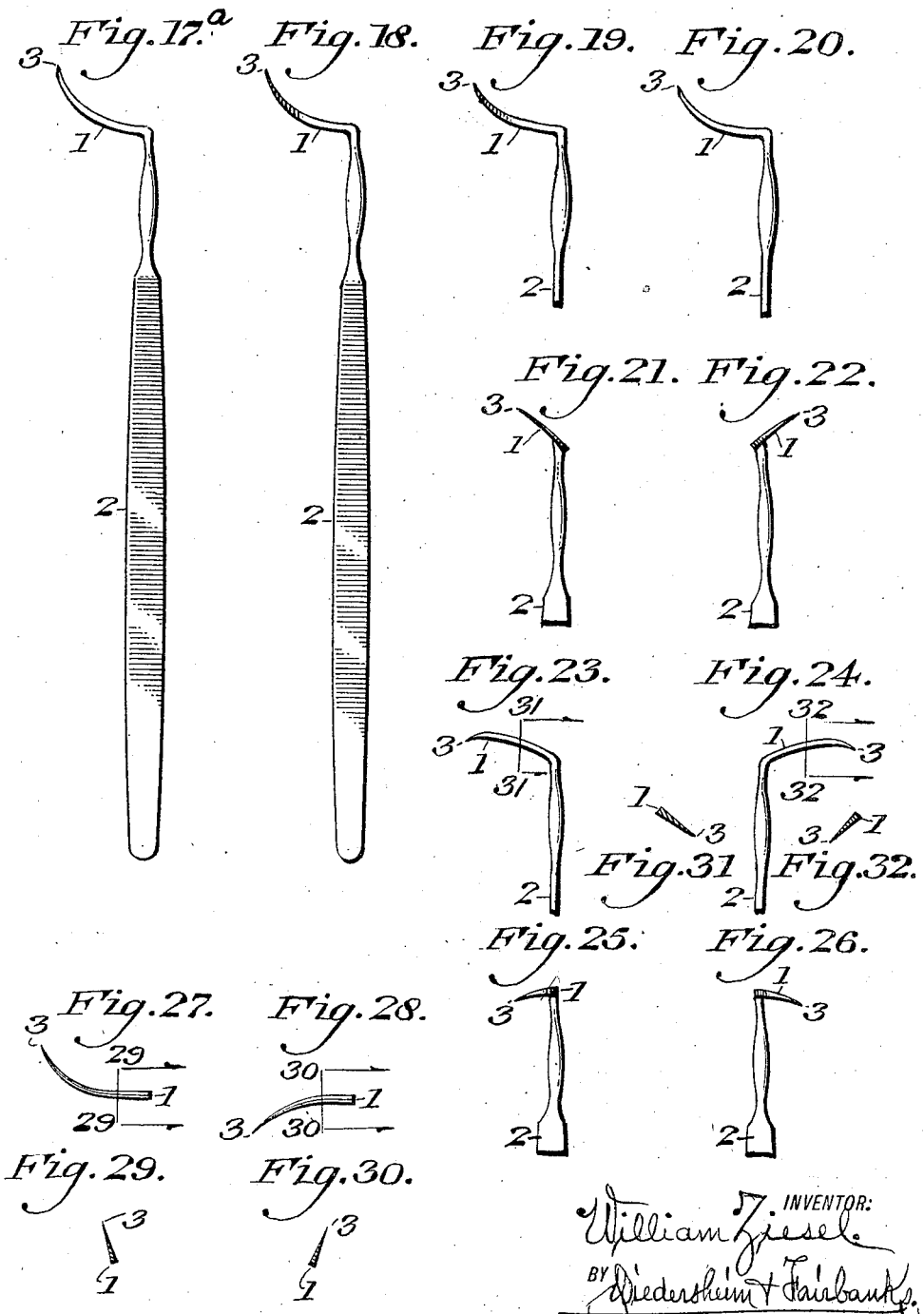

Patented May 15, 1923.

1,455,374

UNITED STATES PATENT OFFICE.

WILLIAM ZIESEL, OF PHILADELPHIA, PENNSYLVANIA.

DENTAL LANCET FOR SURGICAL TREATMENT OF PYORRHEA.

Application filed August 4, 1921. Serial No. 489,927.

*To all whom it may concern:*

Be it known that I, WILLIAM ZIESEL, a citizen of the United States, residing in the city and county of Philadelphia, State of Pennsylvania, have invented a new and useful Dental Lancet for Surgical Treatment of Pyorrhea, of which the following is a specification.

My invention consists of dental lancets or instruments adapted for the removal of diseased gum tissues, from, around and between teeth, and cutting out therefrom what are termed pyorrheal pockets for the treatment and the surgical cure of pyorrhea alveolaris or "Riggs disease", or any disease which may attack or destroy the membranes that hold the teeth in the mouth, or for use for other purposes in dentistry, or in surgery.

The invention is satisfactorily illustrated in the accompanying drawings, but the important instrumentalities thereof may be varied, and so it is to be understood that the invention is not limited to the specific details shown and described, as long as they are within the spirit or scope of the claim.

Referring to the drawings:—

Figures 1 and 3 represent side elevations of the dental lancets embodying my invention.

Figure 2 represents an elevation of the lancet of Figure 1, at right angles thereto.

Figure 4 represents an elevation of the lancet of Figure 3, at right angles thereto.

Figures 5 and 6 represents side elevations of other embodiments of the invention, portions of the handles thereof being removed.

Figure 7 represents a plan view of the embodiment of Figure 5.

Figure 8 represents a plan view of the embodiment of Figure 6.

The remaining Figures 9–32 (inc.) represent perspective views and sections of other embodiments of the invention.

Again referring to the drawings, similar numerals of reference indicate corresponding parts in the figures, as follows:—

1 designates the blade of a lancet of the character to be stated. 2 designates the handle thereof. 3 designates the point of the lancet thereof which is double edged thin paper-like flatness in counterdistinction to round points, or chisel points, and the blade is deflected or extended from the handle at various angles thereto, as shown in the different groups, producing somewhat spear or wedge shaped thin flat pointed double edged lancets of spring tempered steel viz., at right angles as in Figures 1–8 inclusive at right angles somewhat turned obliquely as in Figures 9–13 inclusive and turned in such manner to be rights or lefts, as shown in Figures 13 and 14, and at obtuse angles turned upwardly as in Figures 15 and 16. But the angularities and directions of projection of the blades from the handles may be varied from what are shown in the drawings without departing from my invention.

The blades 1 has sides converging from its place of connection with the handle 2 to a well defined point 3. In some instances the sides are right lines (or flat) and in others they are concave; but in all instances they are very finely and thinly sharpened and may be turned in such manner as to be rights and lefts, by which means the operator making proper selections of instruments may reach every part of the gum which surrounds any tooth and operate on the same as to cut therefrom any diseased membrane that may exist, without tearing, scraping or injuring any other tissue, dividing the gum tissue by cutting in two opposite directions simultaneously or in either direction with one and the same identical stroke as the lance enters the tissues under the instant control of the operator.

In Figures 17–32 inclusive I show a group of instruments in which the blades or lancets are somewhat segmental or horn shaped, sharpened on their curved sides converging to well defined thin flat points of spring tempered steel and they are deflected from the handles at various angles thereto, viz., Figures 17–20 inclusive, and 27–30 inclusive, the blades are true circles having a radius of $\frac{5}{8}''$ to $\frac{3}{4}''$, subtending an arc of 40 degrees to 70 degrees from the vertical, making the cutting edge from $\frac{7}{16}''$ to $\frac{5}{8}''$ long, terminating or converging to a well defined thin flat spring tempered steel point. In Figures 21–26 inclusive, the cutting edge is a special curve (elliptical or parabolical) converging to a well defined thin flat spring tempered steel point, enabling the operator at will by pressure to change the arc or plane of the blades regaining its original shape automatically on the release of pressure.

By the use of these specially constructed instruments the operator may cut out a diseased membrane between the large molar teeth, both front and back, while the spear or wedge shaped lancets may be inserted in between the crevices of front teeth, and the outside, and sometimes the insides of all teeth to be reached for cutting the diseased membranes of the gums, without injuring other tissues.

It will be seen that the blades being made of thin, delicate tempered steel, they are spring tempered and elastic throughout the lengths of their double cutting surfaces or edges converging into a single flat point of spring tempered steel regaining their shape on release of pressure. Being deflected from the handle at an angle thereto, the operator is enabled at will, to make with a delicate swift or slow stroke a short or long extended clean, smooth, deep or shallow cut of the gums and soft tissues between and surrounding the teeth in any location in the mouth in the direction of the cutting edge of the blade in two opposite directions automatically with one and the same identical stroke or in either of the two directions with the same stroke at the will of the operator always being under the instant control of the operator, without scraping, chipping dragging or otherwise injuring the soft tissues anywhere along the entire length of incision, or any other place, the hand of the operator being entirely free to perform an operation without utilizing the teeth or any other object as a fulcrum or rest.

Summarizing, attention is directed to the fact that each blade is made of tempered spring steel, being thin and elastic throughout its length from the point of the blade to the shank or handle. Because of its delicate construction when any portion of the blade enters a diseased tissue, membrane or gum, the blade cuts in two opposite directions automatically with the same identical stroke or cut or in either single direction at will of the operator and yields most sensitively without force, so as not to be harsh or severe in the operation of the removal of the diseased tissues, but on the contrary renders the operation gentle and painless, without any injury or damage, or danger of injury, to any part of the membrane or gum along the entire cut or operation.

It is evident that the operator may require the employment of several lances of the different forms shown, or others on substantially the same lines to effect an operation.

Having thus described my invention what I claim as new and desire to secure by Letters Patent, is:—

An instrument for the purpose described, consisting of a blade formed of tempered spring steel and a handle therefor, said blade being deflected from said handle at a suitable angle thereto and having a sharp double cutting edge terminating in a thin paper-like flat point adapted to cut or divide the tissue in two opposite directions at one and the same time automatically or in either direction at the will of the operator and being thin and elastic throughout the length of said edge, regaining its shape instantly and automatically upon release of pressure.

WILLIAM ZIESEL.

Witnesses:
JOHN A. WIEDERSHEIM,
N. BUSSINGER.